Figure 1:
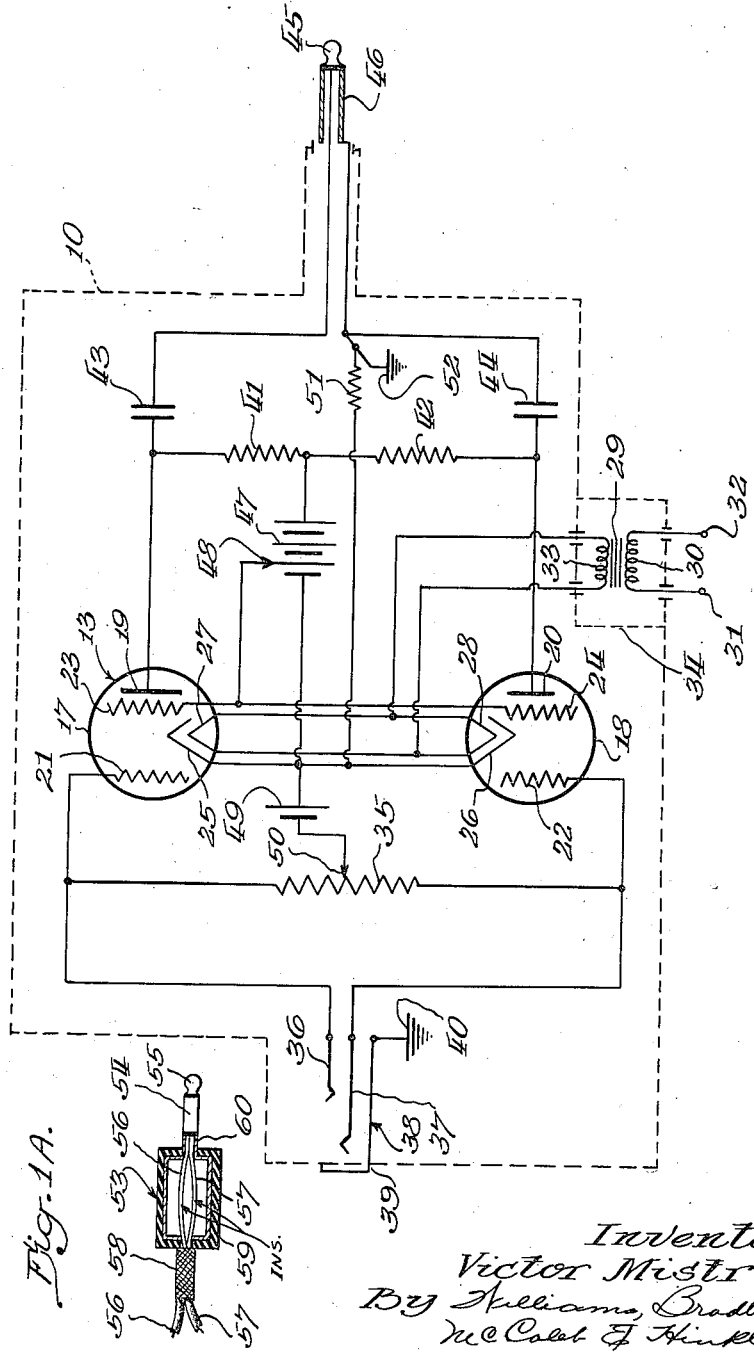

July 29, 1941.　　V. MISTRO　　2,251,151
AMPLIFYING SYSTEM
Filed Sept. 22, 1938　　3 Sheets-Sheet 2

Inventor
Victor Mistro
By
Williams, Bradbury,
McCabe & Hinkle
Attys.

July 29, 1941.                V. MISTRO                    2,251,151
                           AMPLIFYING SYSTEM
                        Filed Sept. 22, 1938           3 Sheets-Sheet 3

Fig. 3.

Inventor
Victor Mistro
By Williams, Bradbury,
McCaleb & Hinkle
Attys.

Patented July 29, 1941

2,251,151

UNITED STATES PATENT OFFICE 2,251,151

AMPLIFYING SYSTEM

Victor Mistro, Chicago, Ill.

Application September 22, 1938, Serial No. 231,122

10 Claims. (Cl. 179—171)

My invention relates to amplifying systems, and more particularly to such systems having high gain and utilized for amplifying impulses for such purposes as studying wave forms where fidelity and constancy of operation are particularly desirable.

The amplification and study of very small electrical impulses and waves that are generated or controlled by the actions of certain parts of the human anatomy has become an adjunct to medical science. Because of the minuteness of the energy or potentials to be amplified, high gains in both potential and power are required, particularly where a recording device is actuated from the output of the amplifier. The actuation of a recording device is very desirable in such work for the preservation and study of the results and to facilitate correlation of the results with other events. Also, fidelity and the practical elimination of the generation of impulses within the amplifier, or amplification of outside disturbances are very important in obtaining consistent and usable results.

To improve the portability of the apparatus and eliminate the care required by storage batteries, it is desirable that as much of the apparatus as possible be energized from an alternating current source. However, the requirements of fidelity and constancy of amplifier operation without regeneration make special precautions necessary in utilizing alternating current mains as a power source. These requirements also, when considered from the standpoint of economics, make the judicious selection of power sources for various circuits an additional problem.

Although not limited to uses related to medical science, the amplifying system of my invention, which is disclosed herein, is particularly adapted to the amplification of electrical impulses or waves obtained from the human anatomy, such as from electrodes applied to different parts of the head. With such use in mind, particular attention has been paid to the judicious selection of power sources and features of design which are consistent with necessary factors, such as high gain, fidelity, constancy of operation, freedom from disturbances from outside the amplifier and generated within the amplifier, as well as portability.

It is, therefore, an object of my invention to provide an amplifying system adapted to be used for the amplification and recording of electrical impulses or waves obtained from parts of the anatomy.

Another object of my invention is to provide an amplifying system which includes a multi-stage, high gain amplifier in which the higher voltages and filament heating voltages are obtained from the alternating current mains and a voltage regulating means for minimizing the effect of variations of voltage of the mains upon the output of the amplifier.

Another object of my invention is to provide a high gain multi-stage amplifier including means for preventing oscillation of the amplifier tubes and the consequent generation of waves or impulses within the amplifier itself. In accordance with my invention, this object is accomplished by the connecting of resistors in series with the control grids of certain of the amplifier tubes in addition to dividing the amplifier into separately shielded sections and separating and shielding the power supply means for the separate sections.

Another object of my invention is to provide an amplifying system including stages of the push-pull type and means for balancing the load on the tubes of the push-pull stages. In the disclosed embodiment of my invention this object is accomplished by the provision of an indicating device or meter in the output circuit of the last push-pull stage, a variable resistance unit for balancing the load on the vacuum tubes of the said last push-pull stage and a variable resistance unit for subsequently balancing the input to the preceding push-pull stage; the proper balancing of the output from the last push-pull stage and input to the preceding push-pull stage being indicated by the indicating device.

Another object of my invention is to provide a voltage regulating system particularly adapted for use in connection with an amplifier system and which includes an instrumentality providing a partial regulation of the voltage and means in addition to the said instrumentality for providing a more precise regulation of the voltage. In the disclosed embodiment of my invention a gas discharge tube is utilized to provide the partial regulation of the rectified alternating current voltage and a pair of cooperating vacuum tubes provide the more precise regulation thereof.

Another object of my invention is to provide an amplifying system including a voltage regulator having gas discharge and vacuum tube control instrumentalities and a cooperating circuit including resistors for stabilizing high voltages utilized in the amplifier.

Another object of my invention is to provide an amplifying system including separately shielded connected sections, each of which sections includes one or more amplifying stages and some of which sections include voltage regulating means for stabilizing voltages utilized in the stage or stages within the same section.

Another object of my invention is to provide an amplifying system comprehending a push-pull type amplifying stage and a power supply circuit therefor including a voltage regulator tube for regulating the anode potential of each of the push-pull amplifier tubes and a variable impedance element for balancing or controlling the current flow through the voltage regulator tubes.

Figure 2:
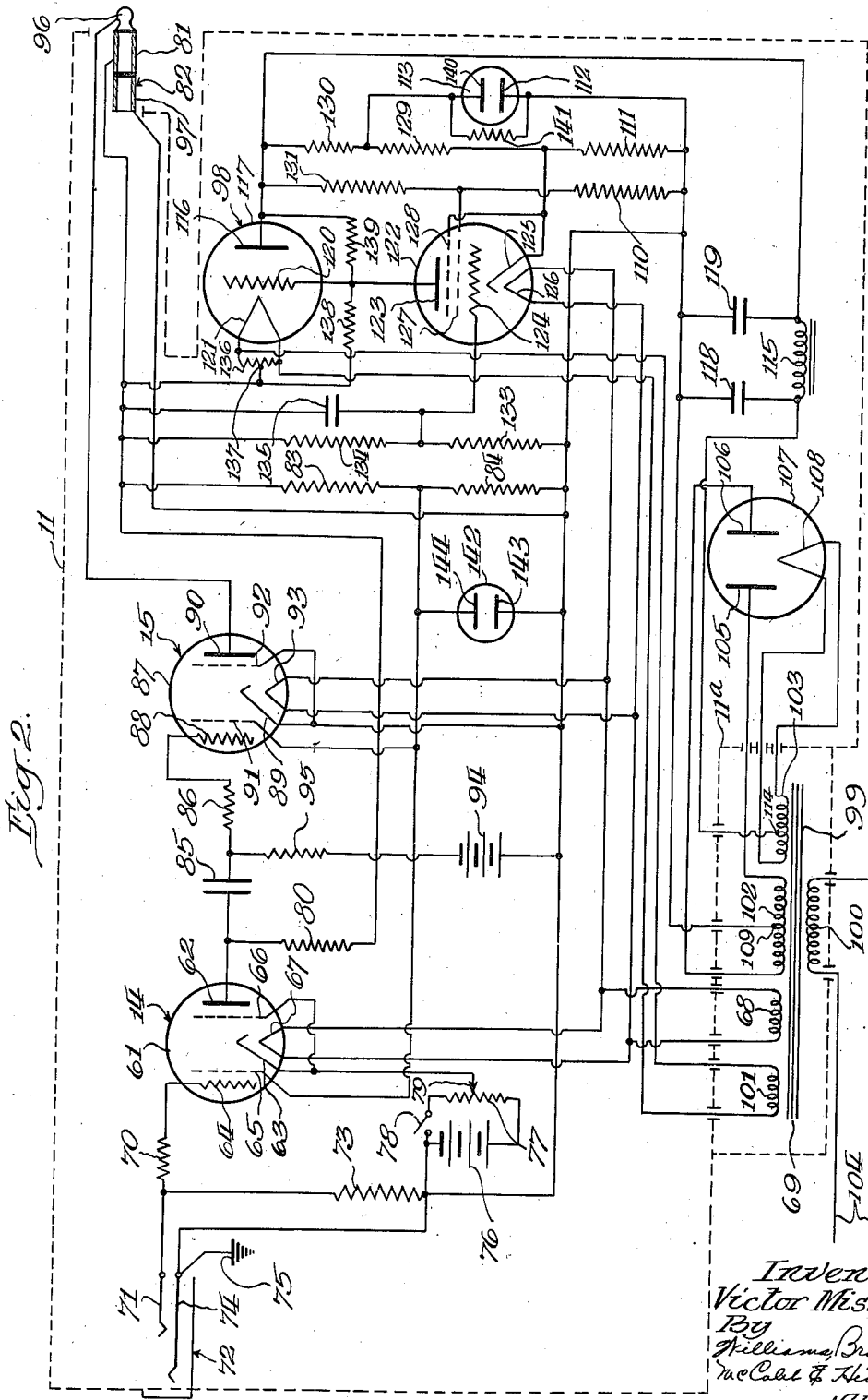

The foregoing, together with further objects, features and advantages of my invention are set forth in the following description of a specific embodiment thereof illustrated in the accompanying drawings wherein:

Figs. 1, 2 and 3 are circuit diagrams of sectional parts of an amplifying system which constitutes a preferred embodiment of my invention. Figure 1A is a preferred form of connector adapted to be utilized with the disclosed circuit diagrams. Having general reference to the drawings, the amplifying system of my invention is preferably divided into sections which are separately shielded, as indicated by the dotted lines at 10 in Fig. 1, 11 in Fig. 2, and 12 in Fig. 3.

A first stage 13 of the amplifier which is enclosed in the shield 10 and shown in Fig. 1, preferably constitutes the first section and is of the resistance coupled push-pull type. The second section, which is shown in Fig. 2, preferably includes two resistance coupled stages 14 and 15 connected in cascade and enclosed in the shield 11. The third section, shown in Fig. 3, preferably includes a resistance coupled push-pull stage 16, which is enclosed in the shield 12. The stages in the sections shown in Figs. 1, 2 and 3 are adapted to be connected in cascade, as will be more fully described.

With particular reference to Fig. 1, vacuum amplifier tubes 17 and 18, respectively, include anodes or plates 19 and 20, control grids 21 and 22, screen grids 23 and 24, cathodes 25 and 26, and heaters 27 and 28. The heaters 27 and 28 are connected in parallel and a transformer 29 is connected thereacross to energize or heat the heaters. The transformer 29 has a primary winding 30 that is connected to line terminals 31 and 32 which are adapted to be connected to alternating current mains and has a secondary winding 33 connected across the heaters 27 and 28. This transformer 29 is preferably individually shielded by a shield 34. The control grids 21 and 22 are connected across a resistor 35 and are respectively connected to input terminals 36 and 37 which are preferably spring contacts of a jack 38, which jack has another contact element 39 that is grounded at 40.

The anodes or plates 19 and 20 are connected together through anode or plate coupling resistors 41 and 42 and are respectively connected through condensers 43 and 44 to output terminals 45 and 46, which are preferably the tip and ring elements of a jack. The mid-tap or common connection of the resistors 41 and 42 is connected to the positive terminal of a battery 47, the negative terminal of the battery 47 being connected to the cathodes 25 and 26 so that the anode potential is provided thereby.

The screen grids 23 and 24 are connected to a tap 48 on the battery 47 to establish their potential. A battery 49 having one terminal connected to the cathodes 25 and 26 and the other terminal connected to a variable mid-tap 50 on the resistor 35 provides a biasing potential for the grids 21 and 22. The cathodes 25 and 26 are also connected through a resistor 51 to the output terminal or ring 46. The output terminal or ring 46 is also preferably grounded at 52.

A plug 53, shown in Fig. 1A, is provided for making input connections through the contacts 36 and 37 of the jack 38 to the grids 21 and 22. This plug 53 has a ring or contact element 54 that is adapted to contact the spring 37 and a tip or contact element 55 that is adapted to engage the contact 36. The ring 54 and tip 55 are connected to suitable connecting leads 56 and 57, which are preferably shielded as indicated at 58 and serve to make connection to suitable electrodes or signal input contacts. As a further precaution to prevent the pick-up of stray signals or disturbances, it is preferable that the plug 53 be shielded as at 59, the shield 59 being connected to a sleeve contact 60 of the plug which is grounded at 40 through the contact 39 of the jack.

With particular reference to Fig. 2, a vacuum amplifier tube 61 is connected in the amplifier stage 14 and includes an anode 62, a cathode 63, a control grid 64, a screen grid 65, a suppressor grid 66 and a heater 67. The heater 67 is energized from a secondary winding 68 of a transformer 69, which transformer 69 is preferably enclosed in a shield 11a. The control grid 64 is connected through a resistor 70 to an input terminal or spring contact 71 of a jack 72 and to one end of a grid resistor 73. The other end of the grid resistor 73 is connected to an input terminal or spring contact 74 of the jack 72 and is preferably grounded at 75. A battery 76 has a resistor 77 connected thereacross through a switch 78 and has one end connected to the input terminal or contact 74. A variable mid-tap 79 on the resistor 77 is connected to the cathode 63 so that the battery 76 provides a grid biasing potential which is varied by varying the position of the mid-tap 79 on the resistor 77 when the switch 78 is closed. The suppressor grid 66 is connected to the cathode 63. The anode 62 is connected through an anode or plate resistor 80 to a contact or ring 81 of a plug 82 and to a voltage divider comprising resistors 83 and 84.

The anode 62 is coupled to the succeeding amplifier stage 15 through a condenser 85 and a resistor 86. The amplifier stage 15 includes a vacuum amplifier tube 87, which has a control grid 88, a cathode 89, an anode 90, a screen grid 91, a suppressor grid 92, and a heater 93. A battery 94 has one terminal connected to the cathode 89 and the other terminal connected to the control grid 88 through a grid resistor 95 and the series resistor 86 to provide the biasing potential for the grid 88. The suppressor grid 92 is connected to the cathode 89. The heater 93 is energized from the secondary winding 68 which also energizes the heater 67 of the tube 61. The anode 90 is connected to an output terminal or tip contact 96 of the plug 82. A sleeve contact 97 of the plug 82 is grounded at 75.

Since the anode and screen grid potentials for the amplifier tubes 61 and 87 are provided through a voltage regulator 98, they will be more fully defined in the description of the voltage regulator system.

The anode and screen grid potentials are preferably provided from an alternating current source. The transformer 69 has a core 99, a primary winding 100 and secondary windings 68.

101, 102 and 103. The primary winding 100 has leads 104 that are adapted to be connected to a source of alternating current. The secondary winding 102, which is preferably a high voltage winding, has its ends connected to plates or anodes 105 and 106 of a rectifier tube 107. The filament or cathode 108 of the rectifier tube is energized by the secondary winding 103. The secondary winding 102 has a center tap 109 that is connected to voltage divider resistors 110 and 111 and to an electrode 112 of a gas discharge tube 113. The secondary winding 103 has a center tap 114 that is connected through an iron core choke coil 115 to the anode 116 of a vacuum regulator tube 117. Filter condensers 118 and 119 are connected to the ends of the choke coil 115 and to the lead from the center tap 109 of the secondary winding 102. The vacuum regulator tube 117 includes, besides the anode 116, a control grid 120 and a filament or cathode 121. A regulator control tube 122 includes an anode 123, a control grid 124, a cathode 125, a heater 126, a screen grid 127, and a suppressor grid 128.

The voltage divider which includes the resistor 111 also includes resistors 129 and 130 connected in series across the high voltage leads from the center taps 109 and 114 of the secondary windings 102 and 103. The voltage divider which includes the resistor 110 also includes a resistor 131 connected in series therewith across the same high voltage leads. The cathode 125 and suppressor grid 128 of the control tube 122 are connected together and to the common terminals of the voltage divider resistors 111 and 129 to establish the potential thereof. The screen grid 127 is connected to the common terminal of the voltage divider resistors 110 and 131. The heater 126 of the control tube 122 is energized from the secondary winding 68. The potential of the control grid 124 of the control tube 122 is established by its connection to the common terminal of voltage divider resistors 133 and 134, which are connected in series and to the center tap 109 of the secondary winding and the ring or terminal 81 of the plug 82. A condenser 135 is preferably connected across the resistor 134.

The filament or cathode 121 of the regulator tube 117 is energized from the secondary winding 101 and preferably has a tapped resistor 136 connected thereacross to provide a mid-tap connection 137 to the filament. The mid-tap connection 137 is connected to the ring 81 of the plug 82 and to one end of a resistor 138. The other end of the resistor 138 is connected to the control grid 120. A resistor 139 has one end connected to the anode 116 and the other end connected to the control grid 120.

An electrode 140 of the gas discharge tube 113 is connected to the common terminal of the resistors 129 and 130, so that the gas discharge tube 113 is connected across the voltage divider resistors 111 and 129. A resistor 141 is preferably connected to the electrodes 112 and 140 of the gas discharge tube.

A gas discharge tube 142 has electrodes 143 and 144. The electrode 143 is connected to the center tap 109 of the secondary winding 102 and the electrode 144 is connected to the screen grids 65 and 91 of the amplifier tubes 61 and 87, respectively. The gas discharge tube 142 is also connected across the voltage divider resistor 84. The gas discharge tubes 142 and 113 each have break-down voltages somewhat below the voltages applied thereto and such that they act somewhat as variable impedances for regulating the voltages that are applied thereto.

With particular reference to Fig. 3, the amplifier stage 16 includes vacuum amplifier tubes 146 and 147. The tube 146 has an anode or plate 148, a grid 149 and a cathode or filament 150. The tube 147 has an anode or plate 151, a control grid 152 and a cathode or filament 153. The control grids 149 and 152 are connected through grid coupling resistors 154 and 155 that are connected in series. The grid 149 is also connected to one side of a coupling condenser 156, the other side of which condenser is connected to one end of a resistor 157 and to an input terminal or contact 158. The grid 152 is connected to one side of a coupling condenser 159 and the other side of the condenser 159 is connected to the other end of the resistor 157 and to an input terminal or contact 160. The input terminals or contacts 158 and 160 are preferably contacts of a jack 161 and engage the tip 96 and ring 81, respectively, of the plug 82. The resistor 157 is the plate resistor for the amplifier tube 87 and is preferably placed in the section shown in Fig. 3 to shorten the leads which extend therefrom to the control grids 149 and 152. A grid bias resistor 162 has one end grounded at 163 and connected to the common terminal of the resistors 154 and 155. The filaments or cathodes 150 and 153 are connected in parallel and are energized from a secondary winding 164 of a transformer 165. The secondary winding 164 is preferably provided with a center tap at 166, which is connected to the other end of the grid biasing resistor 162.

The transformer 165 has a primary winding 167 and secondary windings 168, 169, 170 and 171, in addition to the secondary winding 164. Leads 172, that are connected to the ends of the primary winding 167, are adapted to connect the primary winding to a suitable source of alternating current. The ends of the secondary winding 169 are connected to anodes or plates 173 and 174 of a rectifier tube 175. The rectifier tube 175 has a cathode or filament 176 that is energized from the secondary winding 168. A center tap 177 on the secondary winding 169 is connected to the common terminal of the resistors 154 and 155 and to a contact 178 of the jack 161, which contact 178 engages the sleeve 97 of the plug 82. A center tap 180 on the secondary winding 168 is connected through iron core choke coils 181 and 182 to a variable tap 183 on a resistor 184. Filter condensers 185 and 186 are connected to the ends of the choke coil 182 and to ground at 187 and 188, respectively, to assist the choke coils 181 and 182 in filtering the current rectified by the rectifier tube 175. The ends of the resistor 184 are connected through jack switches 189 and 190 to anodes 191 and 192 of voltage regulator tubes 193 and 194, respectively.

The voltage regulator tube 193 has a control grid 195 that is connected to the anode 148 of the amplifier tube 146, and also has a filament or cathode 196 that is connected across the secondary winding 170. The voltage regulator tube 194 has a control grid 197 that is connected to the anode 151 of the amplifier tube 147. A cathode or filament 198 of the regulator tube 194 is connected across the secondary winding 171. The secondary winding 170 has a center tap 199 that is connected through a resistor 200 to the anode 148. The secondary winding 171 has a center tap 201 that is connected through a resistor 202 to the anode 151. Rectified plate current from the center tap 180 of the secondary winding 168 flows through the choke coils 181 and 182, resistor 184, voltage regulator tubes 193 and 194, and resistors 200 and 202, respectively, to the anodes or plates 148 and 151. The jack switches 189 and 190 are preferably provided in the circuits of the anodes 191 and 192 for making the connections to a meter for measuring the anode currents to the voltage regulator tubes 193 and 194.

Output terminals 203 and 204 are provided for making connections to a suitable reproducer or recorder which constitutes a load on the amplifying system. The terminal 204 is connected to the anode or plate 151 of the amplifier tube 147 through the resistor 202. The output terminal 203 is connected to one side of a switch 207 and to one side of a meter or indicating device 208. The meter 208 is preferably one of the center zero type which will deflect in either direction depending upon the direction of current flow therethrough. The other side of the switch 207 is connected to the other side of the meter or indicating device 208 and to one end of the resistor 206, so that when the switch 207 is closed the meter or indicating device is shunted out of the circuit. One end of the resistor 206 is also connected to a variable tap 205 which contacts the resistor, so that a variable portion of the resistor 206 is short-circuited to vary the effective sensitivity of the meter. The other end of the resistor 206 is connected to the resistor 200 and to the center tap 199 of the secondary winding 170. The reproducing device or recorder that is connected to the output terminals 203 and 204 completes a circuit between those terminals.

In the operation of the amplifying system of my invention, which is disclosed herein, the signal or impulse to be amplified is applied to the control grids 21 and 22 of the amplifier tubes 17 and 18 through the leads 56 and 57. In the case of amplifying impulses or waves from some part of the human anatomy, such as those from different parts of the head, suitable electrodes are connected to the leads 56 and 57 and secured to the anatomy. It is particularly important to prevent the picking up of any stray impulses in the input leads which would be amplified along with the impulses that are actually desired and utilized. The input leads are covered by a shield 58 and are also shielded by the shield 59 within the plug 53 to prevent the picking up of such stray impulses.

By utilizing heater type tubes 17 and 18 which do not quickly respond to variations in heater temperature, alternating current can be utilized to heat the heaters 27 and 28 and the cathodes 25 and 26. However, since the impulses from the first stage of the amplifying system are amplified considerably, it is preferable to utilize batteries 47 and 49 for providing the grid biasing, screen grid and anode potentials, because the batteries provide perfectly steady potentials which do not introduce any disturbing impulses. As another precaution against the introduction of stray impulses, the transformer 29 is preferably individually shielded from the rest of the apparatus in the first and other stages.

The impulses amplified by the first stage of the amplifier, which is included in the section shown in Fig. 1, are applied to the grid 64 and the cathode 63 of the amplifier tube 61 through the plug and jack connectors in which the tip 45 and ring 46 of the plug engage the contacts 71 and 74, respectively, of the jack 72. The impulses or waves are amplified in the second section, shown in Fig. 2, by the amplifier stages including the tubes 61 and 87 which are connected in cascade. The amplified impulses from the tube 87 are applied to the third section of the amplifier which is shown in Fig. 3 through the connections provided between the sleeve 82 and contact 161 and between the tip 96 and the contact 158. The additional contact 160 on the jack 161 and the cooperating ring contact 81 are necessary because the plate resistor 157 is preferably placed close to the grids 149 and 152 and the plate or anode potential for the anode or plate 90 is obtained from the cathode or filament 121 of the regulator tube 117 through the mid tap 137 of the resistor 136. This potential is applied to the anode 90 through the resistor 157.

The load or reproducer which preferably comprises a recording device is connected to the terminals 203 and 204 to complete the circuit between those terminals and between the anodes 148 and 151. The recording device (not shown) may be a loud speaker reproducing element with a pen mounted thereon to trace the reproduced wave forms on a moving paper tape when the device is used to amplify impulses, such as those from parts of the anatomy.

When the amplifier is turned on, the section shown in Fig. 3, which constitutes the last stage thereof, is preferably turned on before the other stages; then with only the third section turned on the variable tap 205 on the resistor 206 is adjusted to a position such that the effective sensitivity of the meter or indicating device is reduced. The variable tap 183 on the resistor 184 is adjusted to a position such that the meter 208 reads zero, even when the sensitivity thereof is increased by adjustment of tap 205. This balances the voltage on the amplifier tubes 146 and 147. After the adjustment of the variable tap 183, the other stages are turned on and the position of the variable tap 50 on the resistor 35 is adjusted so that the meter or indicating device 208 is again set at its center zero position. This latter adjustment adjusts the signal input to and the operation of the amplifier tubes 17 and 18. Any deflection of the meter 208 which is not balanced out by adjustment of the taps 183 and 50 on resistors 184 and 35 shows the presence of oscillations or some unbalanced condition in the amplifier.

The previously described adjustments are made without having any signal or impulses applied to the amplifier. After these adjustments are made the switch 207 is closed to shunt the meter or indicating device 208 from the circuit. When the signals or impulses to be amplified are applied through the leads 56 and 57, the variable tap 79 on the resistor 77 is adjusted until the desired amplitude is obtained on the reproducer or recording device that is connected to the output terminals 203 and 204.

Since it adds to the portability and convenience of the apparatus to utilize alternating current wherever possible as a source of power, transformers and rectifiers have been utilized in the second and third sections, shown in Figs. 2 and 3, to provide the power for energizing the cathodes and anodes of the amplifier tubes. To avoid the introduction of variations in the output due to fluctuations of voltage on the amplifier tubes, the second and third sections have each been provided with voltage regulators.

In the second section, shown in Fig. 2, the gas discharge tube 113 provides a partial regulation of the high voltage direct current, and the regulator tube 98, which is at least partially controlled by the control tube 122, provides a more precise regulation of the rectified direct current potentials. The positive side of the rectified current is connected to the anode 116 of the regulator utbe 98 from the center tap 114 of the secondary winding 103. This current flows through the regulator tube 98 to the cathode 121 thereof and to the anodes 62 and 90 of the amplifier tubes. Since the potential of the control grid 124 of the control tube 122 is dependent upon the potential of the cathode 121 of the regulator tube, and the potential of the control grid 120 of the regulator tube is controlled by and directly connected to the anode 123 of the control tube, the control tube serves as a controlling element to control the operation of the regulator tube. Although the potential of the control grid 124 is actually positive, it is below the potential of the cathode 125, so that it is actually negative with respect to the cathode.

It has been found that the resistors 138 and 139, which are respectively connected from the cathode 121 to the grid 120 and from the anode 116 to the grid 120, stabilize and improve the operation of the regulator tube 98. The resistance values of the resistors 138 and 139 are preferably high.

In addition to the gas discharge tube 113 and the regulator tube 98, a second gas discharge tube 142 is connected across the resistor 84 to control the voltage applied to the screen grids 65 and 91 and improve the operation and stability of the amplifier tubes 61 and 87. The break-down voltage of the gas discharge tubes 113 and 142 is preferably below the normal voltage applied thereto, so that the tubes continually glow during normal operation. The resistor 141 that is connected across the gas discharge tube 113 controls the voltage applied across that gas discharge tube.

In the voltage regulating system utilized in the third section of the amplifier, which is shown in Fig. 3, the potential is applied to the anode 148 through the resistor 200 and the regulator tube 193, since one end of the resistor 200 is connected to the center tap 199 of the secondary winding 170, and the anode 191 of the regulator tube is connected through a portion of the resistor 184, and the choke coils 181 and 182 to the center tap 180 of the secondary winding 168. The anode 151 of the amplifier tube 147 has its potential applied thereto in a similar manner through the resistor 202 and the regulator tube 194. The resistors 290 and 292 preferably have low resistance values and establish the grid biasing potentials of the grids 195 and 197 of the tubes 193 and 194 respectively, by virtue of their respective connections to cathodes 196 and 198 through windings 170 and 171. The action of the regulator tube 193 is controlled by the potential of the anode 148, since the control grid 195 is connected to the anode 148. The connection of the anode 151 to the control grid 197 causes the action of the regulator tube 194 to be responsive to the potential of the anode 151. The regulator tubes 193 and 194 thus tend to eliminate variations in the direct current potentials applied to the anodes 148 and 151, respectively. The potentials applied to the anodes 148 and 151 are balanced by adjustment of the variable tap 183 on the resistor 184.

The resistors 70 and 86 in Fig. 2, which are respectively connected in series with the control grids 64 and 88 of the amplifier tubes 61 and 87, preferably have high resistance values and are utilized to prevent oscillation of the amplifier tubes 61 and 87. Further to improve the stability of the amplifying stages shown in Fig. 2, all of the voltage dividers are connected to a common ground; that is, an end of each of the resistors 110, 111, 133 and 84 is connected to ground at 75. When the three sections of the amplifier shown in Figs. 1, 2 and 3 are connected together, the shields 10, 11 and 12 are also preferably connected together and connected to an earth ground, such as a water pipe. Then to prevent the pick-up of stray impulses through a person to which the input electrodes are applied, that person is preferably enclosed in a screen booth shield and grounded.

While I have described this specific embodiment of my invention, I contemplate that many changes may be made thereover without departing from the scope or spirit of my invention.

I claim:

1. A high fidelity amplifying system comprising, in combination, a multi-stage vacuum tube audio frequency amplifier having a plurality of sections, means individually shielding said sections to prevent pick-up of extraneous impulses, each of said sections including at least one high fidelity amplifier stage, means connecting the stages in the said sections in cascade, individual power supply means for each of the sections, and voltage regulating means included in a part of the sections for stabilizing some of the voltages utilized in the same section therewith.

2. A high fidelity amplifying system comprising, in combination, a multi-stage vacuum tube audio frequency amplifier having a plurality of sections, means individually shielding said sections to prevent pick-up of extraneous impulses, each of said sections including at least one high fidelity amplifier stage, shielded means connecting the stages in the said sections in cascade, individual power supply means for each of the sections, and voltage regulating means included in a part of the sections for stabilizing some of the voltages utilized in the same section therewith, said voltage regulating means including a plurality of vacuum tube controlling elements.

3. A high fidelity amplifying system comprising, in combination, a multi-stage vacuum tube audio frequency amplifier having a plurality of sections, means individually shielding said sections to prevent pick-up of extraneous impulses, each of said sections including at least one high fidelity amplifier stage, means connecting the stages in the said sections in cascade, individual power supply means for each of the sections, and voltage regulating means included in a part of the sections for stabilizing some of the voltages utilized in the same section therewith, said voltage regulating means including a gas discharge tube for effecting partial regulation of the voltage and vacuum tube means for effecting more precise regulation of the voltage.

4. A high fidelity amplifying system comprising, in combination, a multi-stage vacuum tube audio frequency amplifier having a plurality of sections, means individually shielding said sections to present pick-up of extraneous impulses, each of said sections including at least one high fidelity amplifier stage, means connecting the stages in the said sections in cascade, individual power supply means for each of the sections, and voltage regulating means included in a part of the sections for stabilizing some of the voltages utilized in the same section therewith, said voltage regulating means including a gas discharge tube for effecting partial regulation of the voltage and a pair of cooperating vacuum tubes for effecting more precise regulation of the voltage.

5. An amplifying system comprising, in combination, a multi-stage vacuum tube amplifier comprehending a plurality of shielded sections, a part of said sections each including a single resistance coupled amplifier stage of the push-pull type and one of said sections including a plurality of resistance coupled amplifier stages, each of which last mentioned stages includes a vacuum tube having a control grid, a resistor connected in series with the control grid of each of said vacuum tubes, separate power supply means for each of said sections, and means connecting the amplifier stages together.

6. An amplifying system comprising, in combination, a multi-stage vacuum tube amplifier comprehending a plurality of shielded sections, a part of said sections each including a single resistance coupled amplifier stage of the push-pull type and one of said sections including a plurality of resistance coupled amplifier stages, each of which last mentioned stages includes a vacuum tube having a control grid, a resistor connected in series with the control grid of each of said vacuum tubes, separate power supply means for each of said sections, the separate power supply means for a part of said sections each comprehending a transformer, a rectifier tube and means for regulating direct current potential from the rectifier tube, and means connecting the amplifier stages together.

7. An amplifying system comprising, in combination, a multi-stage vacuum tube amplifier comprehending a plurality of shielded sections, a part of said sections each including a single resistance coupled amplifier stage of the push-pull type and one of said sections including a plurality of resistance coupled amplifier stages, each of which last mentioned stages includes a vacuum tube having a control grid, a resistor connected in series with the control grid of each of said vacuum tubes, separate power supply means for each of said sections, the separate power supply means for a part of said sections each comprehending a transformer, a rectifier tube and means including a plurality of vacuum tubes for regulating direct current potential from the rectifier tube, and means connecting the amplifier stages together.

8. An amplifying system comprising, in combination, a multi-stage vacuum tube amplifier comprehending a plurality of shielded sections, a part of said sections each including a single resistance coupled amplifier stage of the push-pull type and one of said sections including a plurality of resistance coupled amplifier stages, each of which last mentioned stages includes a vacuum tube having a control grid, a resistor connected in series with the control grid of each of said vacuum tubes, separate power supply means for each of said sections, the separate power supply means for a part of said sections each comprehending a transformer, a rectifier tube and means for regulating direct current potential from the rectifier tube, the means for regulating direct current potential in one of the sections comprising gas discharge tube means and a pair of cooperating vacuum tubes, and means connecting the amplifier stages together.

9. In an amplifying system, the combination comprising an amplifier stage of the push-pull type including two vacuum tubes having anodes, a source of direct current, and means for regulating the potential applied to the anodes, said means comprehending a vacuum tube connected in series with and between each of the anodes and the source of potential, the last mentioned vacuum tubes having control grids, and the potentials of each of said control grids being determined by the potential of one of the anodes.

10. In an amplifying system, the combination comprising an amplifier stage including an amplifier tube having an anode, a source of anode potential for the said anode, and means for regulating the potential applied to the anode, said means comprehending a regulator tube having a control grid, an anode and a cathode, the anode of the regulator tube being connected to said source, said cathode being connected to the anode of the amplifier tube, and the anode of the amplifier tube being connected to the control grid of the regulator tube so that the regulator tube is responsive to the potential of the anode of the amplifier tube.

VICTOR MISTRO.